United States Patent
Falzoni et al.

(10) Patent No.: US 12,515,874 B2
(45) Date of Patent: *Jan. 6, 2026

(54) CAPSULE FOR PREPARING BEVERAGES (71) Applicant: SACMI COOPERATIVA MECCANICI IMOLA SOCIETA' COOPERATIVA, Imola (IT)

(72) Inventors: Alessandro Falzoni, Imola (IT); Cristian Spadoni, Lugo (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/004,954

(22) PCT Filed: Jul. 13, 2021

(86) PCT No.: PCT/IB2021/056294
§ 371 (c)(1),
(2) Date: Jan. 10, 2023

(87) PCT Pub. No.: WO2022/013739
PCT Pub. Date: Jan. 20, 2022

(65) Prior Publication Data
US 2023/0303314 A1 Sep. 28, 2023

(30) Foreign Application Priority Data
Jul. 14, 2020 (IT) .................. 102020000017071

(51) Int. Cl.
B65D 85/80 (2006.01)
B29C 43/02 (2006.01)
(Continued)

(52) U.S. Cl.
CPC ........ *B65D 85/8061* (2020.05); *B29C 43/021* (2013.01); *B29C 2043/026* (2013.01);
(Continued)

(58) Field of Classification Search
CPC .............. B65D 85/8043; B65D 85/804; B65D 85/8046; B65D 85/8061; B29C 43/021
See application file for complete search history.

(56) References Cited

U.S. PATENT DOCUMENTS 5,176,284 A * 1/1993 Sorensen ............... A01G 9/021
206/505
5,325,765 A * 7/1994 Sylvan ................ A47J 31/3695
426/77
(Continued)

FOREIGN PATENT DOCUMENTS

JP 2000262405 A 9/2000
JP 2007504889 A 3/2007
(Continued)

OTHER PUBLICATIONS

Notice of Reasons for refusal in Japanese Patent Application No. 2023-502580, dated Dec. 8, 2023.
(Continued)

*Primary Examiner* — Ericson M Lachica
(74) *Attorney, Agent, or Firm* — United IP Counselors, LLC (57) ABSTRACT A capsule, intended for the preparation of a beverage in a device for making beverages, includes a body including a bottom wall; a side wall extending around a longitudinal axis between a first annular edge, connected to the bottom wall, and a second annular edge, wherein the side wall has an inside surface, facing towards the longitudinal axis, and an outside surface, opposite to the inside surface; an annular flange, extending from the second annular edge of the side
(Continued)

wall, away from the longitudinal axis; a plurality of protrusions disposed around the longitudinal axis and projecting from a first portion of the outside surface of the side wall, proximal to the flange.

14 Claims, 5 Drawing Sheets

(51) Int. Cl.
*B65D 85/804* (2006.01)
*B29K 23/00* (2006.01)
*B29L 31/00* (2006.01)

(52) U.S. Cl.
CPC .... *B29K 2023/12* (2013.01); *B29K 2995/006* (2013.01); *B29L 2031/7174* (2013.01)

(56) References Cited

U.S. PATENT DOCUMENTS

| | | | |
|---|---|---|---|
| 9,232,871 B2 | 1/2016 | Rivera | |
| 2002/0020659 A1 | 2/2002 | Sweeney et al. | |
| 2008/0173652 A1* | 7/2008 | Chou | B65D 1/265 220/592.17 |
| 2010/0051498 A1* | 3/2010 | Tsai | B65D 65/466 220/592.2 |
| 2012/0225168 A1* | 9/2012 | Kamerbeek | A23F 5/262 206/0.5 |
| 2012/0269933 A1 | 10/2012 | Rapparini | |
| 2014/0048538 A1* | 2/2014 | Sabounjian | B65B 5/08 220/486 |
| 2014/0255564 A1* | 9/2014 | Rondelli | B65D 81/3227 426/115 |
| 2015/0208852 A1* | 7/2015 | Doglioni Majer | B65D 85/8064 426/115 |
| 2016/0045059 A1* | 2/2016 | Cross | A47J 31/407 426/112 |
| 2016/0157666 A1* | 6/2016 | Brandsma | A47J 31/407 99/295 |
| 2016/0214787 A1* | 7/2016 | Iotti | B65D 85/8055 |
| 2017/0042362 A1 | 2/2017 | Bunner et al. | |
| 2017/0290460 A1* | 10/2017 | Karles | B65D 1/36 |
| 2018/0118450 A1 | 5/2018 | Trombetta et al. | |
| 2018/0160845 A1 | 6/2018 | Beaulieu et al. | |
| 2018/0228314 A1* | 8/2018 | Putnam | B65D 1/28 |
| 2019/0225412 A1* | 7/2019 | Cabilli | B65D 85/8043 |
| 2019/0274468 A1* | 9/2019 | Dubief | A47J 31/401 |
| 2020/0000266 A1* | 1/2020 | Melrose | A47J 31/407 |
| 2020/0047984 A1* | 2/2020 | Halliday | A47J 31/407 |
| 2020/0156853 A1* | 5/2020 | Clarke | B29C 44/06 |
| 2020/0180855 A1* | 6/2020 | Parve | B01D 29/05 |

FOREIGN PATENT DOCUMENTS

| | | |
|---|---|---|
| JP | 2014531235 A | 11/2014 |
| JP | 201627892 A | 2/2016 |
| WO | 0056629 A1 | 9/2000 |
| WO | 2005026018 A1 | 3/2005 |
| WO | 2010137954 A1 | 12/2010 |
| WO | 2013038382 A1 | 3/2013 |
| WO | 2013164669 A1 | 11/2013 |
| WO | 2015056238 A1 | 4/2015 |
| WO | 2015170358 A3 | 1/2016 |

OTHER PUBLICATIONS

International Search Report and Written Opinion issued in International Application No. PCT/IB2021/059294, dated Oct. 5, 2021.

* cited by examiner

CAPSULE FOR PREPARING BEVERAGES

TECHNICAL FIELD

This invention relates to a capsule intended for the preparation of a beverage in a device for making beverages. This invention also relates to a method for making a capsule and a mould for making a capsule.

BACKGROUND ART

This disclosure addresses the sector of the production of beverages by infusion; known in this sector is the use of capsules containing infusion material such as coffee, for example. The capsules comprise a cup, or body, and a lid and are designed to be placed in specific beverage making machines where hot water or steam is fed into the capsule in order to brew the beverage.

More specifically, this disclosure addresses the sector of the production by infusion of beverages such as American coffee; the capsules used in this sector are larger than the capsules used in Nespresso-like coffee machines; typically, the capsules are provided with a filter element that divides the internal space into a first portion, containing a substance (coffee, for example) intended for the production of the beverage, and a second portion. The beverage making machine feeds hot water into the first portion; the substance contained in the first portion is infused and produces the beverage, which migrates into the second portion through the filter element; lastly, the machine extracts the beverage from the second portion.

Capsules of this kind are described, for example, in the following patent documents: US2002/0020659, U.S. Pat. No. 9,232,871B2, US2018160845A1, US2018118450A1, US2017042362A1.

One problem with prior art capsules is that if the capsule production process involves stacking a plurality of capsules on top of one another after the capsule body has been formed and before the internal space is filled with the infusion substance, the capsules tend to stick together, making it difficult to separate them from each other. To overcome this problem, a prior art capsule of this kind may be provided, on its side wall, with a cylindrical under-flange profile that is wider than the rest of the side wall (having a frustoconical shape), so that when two capsules are stacked inside one another, the flanges remain spaced apart and make it easier to separate the capsules when necessary. In many cases, however, the under-flange profile is not very effective in preventing the capsules from getting stuck inside each other; moreover, the under-flange profile makes the side wall thicker, which means the capsule is heavier and, consequently, more expensive.

Other solutions for capsules intended to contain products for making beverages are described in patent documents WO2013038382, WO2013164669, WO2015170385 and WO2015056238.

DISCLOSURE OF THE INVENTION

This disclosure has for an aim to provide a capsule for the preparation of a beverage in a device for making beverages, a method for making a capsule and a mould for making a capsule to overcome the above mentioned disadvantages of the prior art.

This aim is fully achieved by the capsule, the method and the mould as characterized in the appended claims.

More specifically, this disclosure concerns a capsule for the preparation of a beverage in a device for making beverages.

The capsule comprises a body (or cup). The body is made preferably of thermoplastic material (such as, for example, polymeric, composite or biocompatible materials).

The body comprises a bottom wall. The body comprises a side wall. The side wall extends around a longitudinal axis, between a first annular edge and a second annular edge. The first annular edge is connected to the bottom wall; thus, the side wall extends between the bottom wall and the second annular edge. The side wall has an inside surface, facing towards the longitudinal axis, and an outside surface, opposite to the inside surface.

The body also comprises an annular flange. The annular flange is connected to the second annular edge of the side wall. The annular flange extends from the second annular edge of the side wall, away from the longitudinal axis. The outside surface of the side wall includes a first portion, which is proximal to the flange, and a second portion, which is distal from the flange. It should be noted that the second portion is preferably frustoconical in shape. The first portion may be cylindrical or frustoconical in shape. In an embodiment, the first portion has a different inclination to the longitudinal axis in comparison with the second portion; more specifically, the first portion is less steeply inclined to the longitudinal axis than the second portion. Preferably, the first portion projects radially from the second portion, away from the longitudinal axis.

It is noted that the flange preferably has a flat shape. Further, the flat shape of the flange defines a plane which coincides with a radial plane, that is, a plane which is perpendicular to the longitudinal axis. In other words, the flange is disposed (entirely) along a plane which is oriented radially, that is, perpendicularly to the longitudinal axis of the capsule. Besides being flat, the front face of the flange is preferably smooth.

The side wall of the capsule body has a thickness; the thickness of the flange is the same or substantially the same as the thickness of the side wall of the capsule body. Therefore, the front face of the flange and the rear face of the flange are (parallel and) spaced by a quantity equal to that thickness. Thus, the flange is thin; the radial extension of the flange is much greater than its thickness.

On the inside of it, the capsule defines a space. In an example embodiment, the space inside the capsule is empty, that is to say, without any partitions or compartments.

The second annular edge is greater than or equal to 35 mm in diameter; more specifically, the second annular edge is greater than or equal to 40 mm in diameter; preferably, the second annular edge is greater than or equal to 45 mm in diameter; still more preferably, the second annular edge is greater than or equal to 50 mm in diameter (for example, 51 mm).

The length of the capsule (that is, of the capsule body, or of the side wall of the capsule body) is greater than or equal to 30 mm, along the longitudinal axis; more specifically, the length of the capsule (that is, of the capsule body, or of the side wall of the capsule body) is greater than or equal to 35 mm, along the longitudinal axis; preferably, the length of the capsule (that is, of the capsule body, or of the side wall of the capsule body) is greater than or equal to 40 mm (for example, 45 mm), along the longitudinal axis. By length of the capsule or of its side wall is meant a distance between the first and the second annular edge.

Preferably, the body includes a plurality of protrusions. The protrusions are disposed around the longitudinal axis.

The protrusions project from the first portion of the outside surface of the side wall. Thus, the protrusions are located on the outside surface of the side wall, at a position adjacent to the annular flange. The protrusions of the plurality of protrusions produce local thickening of the side wall. The function of the protrusions is to prevent the capsule bodies, when stacked inside one another (prior to filling and to application of the lid) from getting stuck inside each other; thus, the protrusions make it easier to subsequently unstack them. Furthermore, by only locally thickening the side wall, these protrusions do not add significant weight to the capsule, which thus remains light, hence economical.

Preferably, the protrusions of the plurality extend along respective axes which are contained in planes passing through the longitudinal axis. The protrusions therefore define ribbings. The planes extend radially from the longitudinal axis. In an embodiment, the axes are parallel to the longitudinal axis. In an embodiment, the axes have a component that is parallel to the longitudinal axis and a component that is radial to the longitudinal axis; the component that is parallel to the longitudinal axis is greater than the radial component. The fact that the protrusions extend along axes which are contained in planes passing through the longitudinal axis or which are substantially parallel to the longitudinal axis facilitates unstacking because, during unstacking, one capsule is pulled out of another by a movement along the longitudinal axis and therefore along the axes of the protrusions.

It should be noted that in other embodiments, the protrusions may have different shapes; for example, they might extend along axes which also have component that is tangential to the longitudinal axis, or they might be in the form of small embossing or in the shape of half spheres.

Preferably, the protrusions of the plurality are angularly equispaced around the longitudinal axis.

Preferably, the plurality of protrusions includes at least three protrusions. Still more preferably, the plurality of protrusions includes at least five protrusions, or at least seven, at least ten, or at least fifteen protrusions.

It should be noted that the annular flange has a rear face, which is directed towards the bottom wall, and a front face opposite to the rear face.

Preferably, the capsule body includes a plurality of protuberances, disposed around the longitudinal axis and projecting from the rear face of the annular flange. The protuberances of the plurality of protuberances produce local thickening of the annular flange. The protuberances have the function not only of facilitating the unstacking of capsules which are stacked inside each other but also of stiffening the annular flange; thanks to the protuberances, the annular flange may be made thinner, making the capsule lighter in weight and allowing savings on material.

Preferably, the protuberances of the plurality extend along respective radial axes. The radial axes are contained in planes which extend radially from the longitudinal axis. More specifically, the radial axes extend along radial directions, starting from the longitudinal axis. Thus, the protuberances define radial ribbings.

It should be noted that in other embodiments, the protuberances might have other shapes: for example, they might be in the shape of half spheres or parallelepipeds.

Preferably, the number of protrusions of the plurality of protrusions is equal to the number of protuberances of the plurality of protuberances.

Preferably, each protuberance of the plurality of protuberances is joined to a corresponding protrusion of the plurality of protrusions. Thus, each protuberance constitutes an extension of a corresponding protrusion on the rear face of the flange.

The annular flange extends from the second annular edge of the side wall up to a further annular edge, which surrounds the annular flange.

Preferably, each protuberance extends from a first end, joined to an end of the corresponding protrusion, up to a second end, positioned on the further annular edge. Thus, each protuberance has a radial extension which is equal to the radial extension of the underside surface of the annular flange.

Each protuberance of the plurality of protuberances makes with the corresponding protrusion of the plurality of protrusions, an angle between 40° and 60°; preferably between 40° and 55°, or between 45° and 55°.

It should be noted that the capsule, at least in its final configuration in which it is ready to be placed in a beverage making machine, also includes a lid. The lid is joined to the annular flange; more specifically, the lid is joined to the front face of the annular flange. The lid, together with the body, delimits, or encloses, an internal space within the capsule. The capsule preferably also comprises a filter element, positioned in the internal space. The filter element may be made of cellulosic material, such as paper, for example. The capsule also comprises a substance for making the beverage. The substance for making the beverage is at least enclosed in a space which is at least partly delimited by the filter element.

More specifically, the filter element divides the internal space into a containing space and a collecting space and the substance for making the beverage is contained in the containing space.

In an example embodiment, the capsule is made of a biocompatible material. In an example embodiment, the capsule is made of a mouldable material, preferably obtained from natural fibres, for example, cellulose.

Alternatively, the material is a biodegradable/compatible synthetic polymeric material.

In an embodiment, the material is BIOMIND CCB07H5, that is to say, a home compostable compound with 35% renewable content, preferably recommended for biodegradable, short-life products.

The properties of this material are shown in the table below:

| PHYSICAL PROPERTIES | UNIT | VALE | TOLERANEC | TEST METHOD |
|---|---|---|---|---|
| Density (23 ± 2° C.) | g/cm3 | 1.43 | Typical value | ISO 1183 A |
| Melt flow index (5 Kg/190° C.) | g/10' | 17 | Typical value | ISO 1133 |
| Tensile stregnth (23 ± 2° C.) | M Pa | 20 | Typical value | ISO 527 |
| Elongation at break (23 ± 2° C.) | % | 200 | Typical value | ISO 527 |
| Melting temperature | ° C. | 113 | Typical value | Internal method |
| Contraction | % | 0.45-0.9 | Typical value | Metodo Interno |
| Oxygen Transmisson Rate | cm3/ m2.24 h | 8.7 | Typical value | ASTM D 3985 (23 C./0% HR) |

Other products that can be used have a melt point in a range between 150° and 200°. Biodegradable resins having the properties set out in the following table can also be used:

| Physical Properties | Typical Values: | Test Method |
|---|---|---|
| Melt Flow Index | <1 g/10 min@ 190° C., 2.16 Kg | ASTM D1238 |
| Melt Volume Rate | 5.4 mL/10 min@ 190° C., 2.16 Kg | ASTM D1238 |
| Density | 1.26 g/cm$^3$ | ISO 1183 |
| Notched Izod Impact @ 20° C. | 90 J/m | ASTM D256 |
| Tensile Strength @ Yield | 37 MPa | ASTM D638 |
| Tensile Modulus | 1.90 GPa | ASTM D638 |
| Tensile Elongation at Yield (%) | 17.0% | ASTM D638 |
| Flexural Modulus | 1.45 GPa | ASTM D790 |
| Flexural Strength | 50 MPa | ASTM D790 |
| Heat Deflection Temperature (° C.) | 95 | ASTM D648 |
| CLTE (−35-80° C.) (10$^6$/K) | 225.5 | |
| Water Vapour Transmission rate** | 21 g/m$^2$/day 0.5 g/m$^2$/day | ASTM F1249 |

Another biocompatible material is INZEA F58 A130®, that is to say, a thermoplastic material made partly from biodegradable materials. INZEA F58 A130® is suitable for injection moulding applications. It can be processed in conventional polyolefin equipment. This material has the 5 following properties:

| PHYSICAL PROPERTIES | CONDITIONS | TEST METHOD | UNIT | INZEA F58 AI30 |
|---|---|---|---|---|
| Melt Volume Rate | 190° C. 2.16 Kg | ISO 1133 | cc/10 min | 8 |
| Moisture content | | NAPPA-032 | % | <0.5 |
| Melting Temperature (DSC) | 10° C./min | ISO 3146 | ° C. | 110-120 |
| MECHANICAL PROPERTIES | | | | |
| Charpy notched impact strength | 23° C. | ISO 179/1eA | kJ/m$^2$ | 3 |
| Flexural modulus | 23° C., 2 mm/min | ISO 178 | MPa | 820 |
| Flexural strength | 23° C., 2 mm/min | ISO 178 | MPa | 33 |
| Heat Deflection Temperature (HDT) | 0.45 Mpa | ISO 75-1/-2 | ° C. | 92 |

Listed below are other materials, each followed by a table showing the respective technical properties:

Ingeo™ Biopolymer 2500HP Technical Data Sheet:

| Typical Material & Application Properties[1] | | |
|---|---|---|
| Physical Properties | Ingeo Resin | ASTM Method |
| Specific Gravity | 1.24 | D792 |
| MFR, g/10 min (210° C., 2.16 kg) | 8 | D1238 |
| Relative viscosity[2] | 4.0 | D6225 |
| Mechanical Properties, molded amorphous with 26° C. mold temperature | | |
| Tensile Yield Strength, psi (MPa) | 9,300 (64) | D638 |
| Tensile Elongation, % | 3.6 | D638 |
| Notched Izod impact, ft-lb/in (J/m) | 0.35 (18.7) | D256 |
| Flexural Strength, psi (MPa) | 16,400 (113) | D790 |
| Flexural Modulus, psi (MPa) | 528,000 (3640) | D790 |
| Heat Distortion Temperature (° C.) 66 psi (0.45 MPa) | 54 | E2092 |
| Molded Linear Shrinkage, % | 0.3-0.4 | |
| Clarity | Transparent | |
| Mechanical Properties, molded crystalline with 120° C. mold temperature[3] | | |
| Tensile Yield Strength, psi (MPa) | 9,500 (65.5) | D638 |
| Tensile Elongation, % | 4.3 | D638 |
| Notched Izod Impact, ft-lb/in (J/m) | 0.75 (40) | D256 |
| Flexural Strength, psi (MPa) | 18,300 (126) | D790 |
| Flexural Modulus, psi (MPa) | 646,000 (4357) | D790 |
| Heat Distortion Temperature (° C.) 66 psi (0.45 MPa) | 144 | E2092 |
| Molded Linear Shrinkage, % | 1.7-1.8 | |
| Clarity | Opaque | |
| Peak crystalline melting point (° C.) | 165-180 | |

TABLE 1

| Typical Material & Application Properties[1] Ingeo ™ Biopolymer 3001D | | |
|---|---|---|
| Physical Properties | Ingeo Resin | ASTM Method |
| Specific Gravity | 1.24 | D792 |
| MFR, g/10 min (210° C., 2.16 kg) | 22 | D1238 |
| Clarity | Transparent | |
| Mechanical Properties | | |
| Tensile Yield Strength, psi (MPa) | 9,000 (62) | D638 |
| Tensile Elongation, % | 3.5 | D638 |
| Notched Izod Impact, ft-lb/in (J/m) | 0.3 (16) | D256 |
| Flexural Strength (MPa) | 15,700 (108) | D790 |
| Flexural Modulus (MPa) | 515,000 (3600) | D790 |
| Heat Distortion Temperature (° C.) | 55 | E2092 |

TABLE 1

Typical Material & Application Properties[1]
Ingeo ™ Biopolymer 3100HP Technical Data Sheet

| Physical Properties | Ingeo Resin | ASTM Method |
|---|---|---|
| Specific Gravity | 1.24 | D792 |
| MFR, g/10 min (210° C., 2.16kg) | 24 | D1238 |
| Relative viscosity[2] | 3.1 | 05225 |
| Mechanical Properties, molded amorphous with 26° C. mold temperature | | |
| Tensile Yield Strength, psi (MPa) | 9,400 (65) | D638 |
| Tensile Elongation, % | 3.4 | D638 |
| Notched Izod impact, ft-lb/in (J/m) | 0.34 (18.2) | 0256 |
| Flexural Strength, psi (MPa) | 16,200 (112) | D790 |
| Flexural Modulus, psi (MPa) | 520,000 (3585) | D790 |
| Heat Distortion Temperature (° C.) 66 psi. (0.455 MPa) | 54 | E2092 |
| Molded Linear Shrinkage, % | 0.2-0.4 | |
| Clarity | Transparent | |
| Mechanical Properties, molded crystalline with 120° C. mold temperature[3] | | |
| Tensile Yield Strength, psi (MPa) | 9,300 (64) | D638 |
| Tensile Elongation, % | 22 | D638 |
| Notched Izod Impact, ft-lb/in (J/m) | 0.6 (32) | D256 |
| Flexural Strength, psi (MPa) | 15.700 (108) | D790 |
| Flexural Modulus, psi (MPa) | 632,000 (4357) | D790 |
| Heat Distortion Temperature (° C.) 66 psi, (0.455 MPa) | 149 | E2092 |
| Molded Linear Shrinkage, % | 1.7-1.8 | |
| Clarity | Opaque | |
| Peak crystalline melting point (° C.) | 165-180 | |

Typical Material & Application Properties
Ingeo ™ Biopolymer 3251D

| Physical Properties | Ingeo 3251D | ASTM Method |
|---|---|---|
| Specific Gravity | 1.24 | D792 |
| MFR, g/10 min (210° C., 2.16kg) | 80 | D1238 |
| MFR, g/10 min (190° C., 2.16kg) | 35 | D1238 |
| Relative Viscosity | 2.5 | |
| Crystalline Melt Temperature (° C.) | 155-170 | D3418 |
| Glass Transition Temperature (° C.) | 55-60 | D3418 |
| Clarity | Transparent | |
| Mechanical Properties | | |
| Tensile Yield Strength, psi (MPa) | 9,000 (62) | D638 |
| Tensile Elongation, % | 3.5 | D638 |
| Notched Izod Impact, ft-lb/in (J/m) | 0.3 (16) | D256 |
| Flexural Strength (MPa) | 15,700 (108) | D790 |
| Notched Izod Impact, ft-lb/in (J/m) | 0.3 (16) | D256 |
| Heat Distortion Temperate (° C.) | 55 | E2092 |

In an example embodiment, the material is a heterophasic copolymer. An example of such a material is BJ356MO, which has the following data sheet:

Physical Properties

| Property | Typical Value<br>Data should not be used for specification work | Test Method |
|---|---|---|
| Density | 905 kg/m$^3$ | ISO 1183 |
| Melt Flow Rate (230° C./2.16 kg) | 100 g/10 min | ISO 1133 |
| Flexural Modulus | 1.500 MPa | ISO 178 |
| Tensile Modulus (50 mm/min) | 1.600 MPa | ISO 527-2 |
| Tensile Strain at Yield (50 mm/min) | 4% | ISO 527-2 |
| Tensile Stress at Yield (50 mm/min) | 27 MPa | ISO 527-2 |
| Heat Deflection Temperature (0.45 N/mm$^2$) [1] | 105° C. | ISO 75-2 |
| Charpy Impact Strength, notched (23° C.) | 4 kJ/m$^2$ | ISO 179/1eA |
| Charpy Impact Strength, notched (−20° C.) | 2.5 kJ/m$^2$ | ISO 179/1eA |

[1] Measured on injection moulded specimens acc. to ISO 1873-2

In an embodiment, the material is a polypropylene copolymer. An example of such a material is BJ368MO, which has the following data sheet:

Physical Properties

| Property | Typical Value<br>Data should not be used for specification work | Test Method |
|---|---|---|
| Density | 905 kg/m$^3$ | ISO 1183 |
| Melt Flow Rate (230° C./2.16 kg) | 70 g/10 min | ISO 1133 |
| Flexural Modulus | 1.500 MPa | ISO 178 |
| Tensile Modulus (50 mm/min) | 1.500 MPa | ISO 527-2 |
| Tensile Strain at Yield (50 mm/min) | 4% | ISO 527-2 |
| Tensile Stress at Yield (50 mm/min) | 25 MPa | ISO 527-2 |
| Heat Deflection Temperature | 102° C. | ISO 75-2 |
| Charpy Impact Strength, notched (23° C.) | 5.5 kJ/m$^2$ | ISO 179/1eA |
| Charpy Impact Strength, notched (−20° C.) | 3.5 kJ/m$^2$ | ISO 179/1eA |

As regards the above listed examples, and the related data sheets, of the material that can be used to make the capsule, it should be noted that for each example, the material making up the plastic should have, for at least one of the parameters shown in the table, the value shown in the table itself (more specifically, for each table, the material should have, for any combination or selection of the parameters of the table, the respective values shown in the table itself).

In an embodiment, the copolymer may be nucleated. Also, the copolymer may be heterophasic and of polypropylene. In an embodiment, the copolymer may be a homopolymer. In an embodiment, the copolymer may be an antistatic homopolymer.

In an example embodiment, the material is a highly-transparent polypropylene random copolymer.

The material obtained from natural fibres may be a powder, a solid or a paste. For example, the material obtained from natural fibres includes a powder to be pressed, or it may be in the form of a ball, a film or a pre-processed product. The pre-processed product may have a flat, concave or disc shape.

It is specified that the internal space is not necessarily filled but may also be left empty. Preferably, the containing space is partly delimited by the lid (and by the filter element) and the collecting space is partly delimited by the bottom wall (and by the filter element). Thus, when the capsule is inserted into the beverage making machine, the machine feeds hot water into the containing space where the substance is located; the beverage is made by infusion and passes through the filter element from the containing space into the collecting space; the machine then extracts the beverage from the collecting space. More specifically, the machine makes a first hole in the lid, through which it feeds the hot water into the containing space, and a second hole in the bottom wall, through which the beverage made is extracted.

In an embodiment, the substance for making the beverage includes coffee granules. In another embodiment, the substance for making the beverage includes coffee powder. In another embodiment, the substance for making the beverage includes chamomile or tea.

This disclosure also provides a method for making a capsule intended for the preparation of a beverage in a device for making beverages. The method comprises a step of forming a body of the capsule. The capsule and, more specifically, the capsule body is made according to one or more aspects of this disclosure. In the step of forming, the bottom wall, the side wall and the annular flange of the capsule body are formed. The side wall extends around a longitudinal axis, between a first annular edge, connected to the bottom wall, and a second annular edge; the side wall has an inside surface, facing towards the longitudinal axis, and an outside surface, opposite to the inside surface. The annular flange extends from the second annular edge of the side wall, away from the longitudinal axis.

The outside surface of the side wall includes a first portion, which is proximal to the flange, and a second portion, which is distal from the flange. In the step of forming the capsule body, a plurality of protrusions are also made which are disposed around the longitudinal axis and which project from the first portion of the outside surface of the side wall. Thus, the protrusions are made in a zone of the outside surface of the side wall, adjacent to the annular flange. The protrusions of the plurality of protrusions produce local thickening of the side wall.

Preferably, also made in the step of forming are a plurality of protuberances, disposed around the longitudinal axis and projecting from the rear face of the annular flange, the rear face being directed towards the bottom wall.

In an embodiment, the step of forming is carried out by compression moulding. Thus, the capsule body is formed from a charge of thermoplastic material. In this embodiment, the protrusions of the plurality of protrusions are made by compression moulding as one with the side wall of the capsule body. The protuberances of the plurality of protuberances are made by compression moulding as one with the annular flange (and with the capsule body).

In this embodiment, the step of forming is carried out by a mould made according to one or more aspects of this disclosure; more specifically, it is carried out by a mould including a lower unit and an upper unit which are movable relative to each other. Thus the step of forming comprises preparing the charge of thermoplastic material, positioning the charge on the lower unit of the mould, closing the mould by moving the upper unit and the lower unit towards each other until they delimit a moulding cavity in which the capsule body is formed from the charge. The step of forming may also comprise cooling the capsule body. The method also comprises a step of opening the mould by moving the upper unit and the lower unit away from each other and a step of extracting the formed capsule from the mould.

In an embodiment, the step of forming is carried out by injection moulding.

In this embodiment, the protrusions of the plurality of protrusions are made by injection moulding as one with the side wall of the capsule body. The protuberances of the plurality of protuberances are made by injection moulding as one with the annular flange (and with the capsule body).

The method may also comprise a step of preparing a filter element and inserting the filter element into an internal space inside the capsule body.

The method may also comprise a step of feeding a substance for making the beverage into the internal space; more specifically, the substance is fed into a portion (also called containing space), within the internal space and partly delimited by the filter element. The method may also comprise a step of joining the lid to the front face of the annular flange so as to close the internal space. After the step of joining the lid, the containing space in which the substance is located is enclosed between the lid and the filter element.

This disclosure also provides a mould for making a capsule intended for the preparation of a beverage in a device for making beverages. The mould is movable between an open configuration and a closed configuration in which it defines a moulding cavity. The moulding cavity is shaped in such a way as to form the capsule according to one or more aspects of this disclosure. More specifically, the moulding cavity includes a bottom recess, a side recess and a flange recess. The side recess extends around a longitudinal axis between a first annular end, which is connected to the bottom recess, and a second annular end. The side recess has an inside wall, facing towards the longitudinal axis, and an outside surface, opposite to the inside wall. The flange hollow is connected to the second annular end and extends from the second annular end, away from the longitudinal axis. The outside wall of the side hollow includes a first portion, proximal to the flange hollow, and a second portion, distal from the flange hollow. Preferably, the second portion is frustoconical in shape. The first portion is cylindrical or frustoconical in shape.

Before the capsule is extracted from the mould, the longitudinal axis of the mould coincides with the longitudinal axis of the capsule which is formed in the mould.

Preferably, the second annular end (specifically, an outer edge thereof) has a diameter which is greater than or equal to 35 mm (or 40 mm, or 45 mm or 50 mm). The moulding cavity (that is, the side hollow) has a length along the longitudinal axis that is greater than or equal to 35 mm (or 30 mm, or 40 mm, or 45 mm).

Preferably, the side hollow includes a plurality of hollows (or recesses), disposed around the longitudinal axis in the first portion of the outside wall of the side hollow. Thus, the recesses are made in a zone of the outside wall adjacent to the flange hollow. The recesses locally widen the side hollow. Preferably, the recesses extend along axes which are contained in respective planes passing through the longitudinal axis. Thus, the recesses define grooves.

It should be noted that the flange hollow has a rear wall, facing towards the bottom hollow, and a front wall, opposite to the rear wall. Preferably, the flange hollow includes a plurality of concavities, disposed around the longitudinal axis in the rear wall of the flange hollow. The concavities locally widen the flange hollow. Preferably, the concavities extend along respective radial axes, disposed radially, starting from the longitudinal axis. Thus, the concavities also define grooves.

Preferably, the number of concavities is equal to the number of recesses.

Each concavity is equal to a respective recess and thus constitutes an extension thereof. Preferably, each concavity makes an angle between 40° and 55° with the respective recess.

Preferably, the mould comprises an upper unit and a lower unit, movable relative to each other along the longitudinal axis. Preferably, the longitudinal axis of the mould is parallel to the weight force. In the open configuration of the mould, the upper unit and the lower unit are spaced apart and in the closed configuration of the mould, the upper unit and the lower unit are close together and delimit the moulding cavity.

BRIEF DESCRIPTION OF DRAWINGS

These and other features will become more apparent from the following description of a preferred embodiment, illustrated by way of non-limiting example in the accompanying drawings, in which.

DETAILED DESCRIPTION OF PREFERRED EMBODIMENTS OF THE INVENTION

With reference to the accompanying drawings, the numeral 1 denotes a capsule. The capsule 1 comprises a body 100. The body 100 includes a bottom wall 101, a side wall 102 and an annular flange 103. The side wall 102 extends around a longitudinal axis A, between a first annular edge 102A and a second annular edge 102B. The first and the second annular edge 102A and 102B surround the longitudinal axis A. The first annular edge 102A is connected to the bottom wall 101. The second annular edge 102B is connected to the annular flange 103.

The side wall 102 has an inside surface, facing towards the longitudinal axis A, and an outside surface, opposite to the inside surface. The side wall 102, or its outside surface, comprises a first portion 1021 and a second portion 1022. The first portion 1021 is proximal to the annular flange 103 and the second portion 1022 is distal from the annular flange 103; more specifically, the first portion 1021 is connected to the annular flange 103 and the second portion 1021 is connected to the bottom wall 101. The first portion 1021 thus extends around the longitudinal axis A between the first annular edge 102A of the side wall and a connecting edge, joining the first portion 1021 and the second portion 1022. The second portion 1022 extends around the longitudinal axis A between the connecting edge, joining the first portion 1021 and the second portion, and the second annular edge 102B. The first portion 1021 has a substantially cylindrical shape; thus, the connecting edge, joining the first portion 1021 and the second portion 1022, has the same diameter D1 as the second annular edge 102B. The second portion 1022 is frustoconical in shape; thus, the connecting edge, joining the first portion 1021 and the second portion 1022, has a diameter that is larger than the diameter of the first annular edge 102A. Therefore, the second annular edge 102B has a diameter D1 that is larger than the diameter of the first annular edge 102A. The diameter D1 of the second annular edge 102B is preferably greater than or equal to 40 mm.

Figure 4:
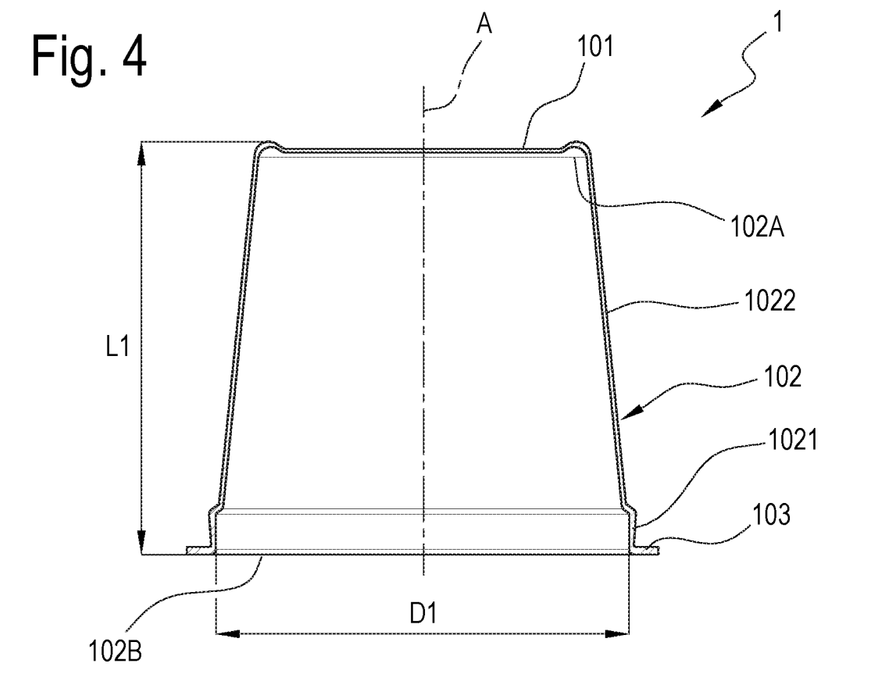
FIG. 4 shows the capsule body of FIG. 1 in a longitudinal cross section.

The length L1 of the side wall 102—that is, of the capsule body 100—is greater than or equal to 35 mm, along the longitudinal axis. The length L1 defines the maximum distance between the bottom wall 101 and the second annular edge 102B.

Figure 1:
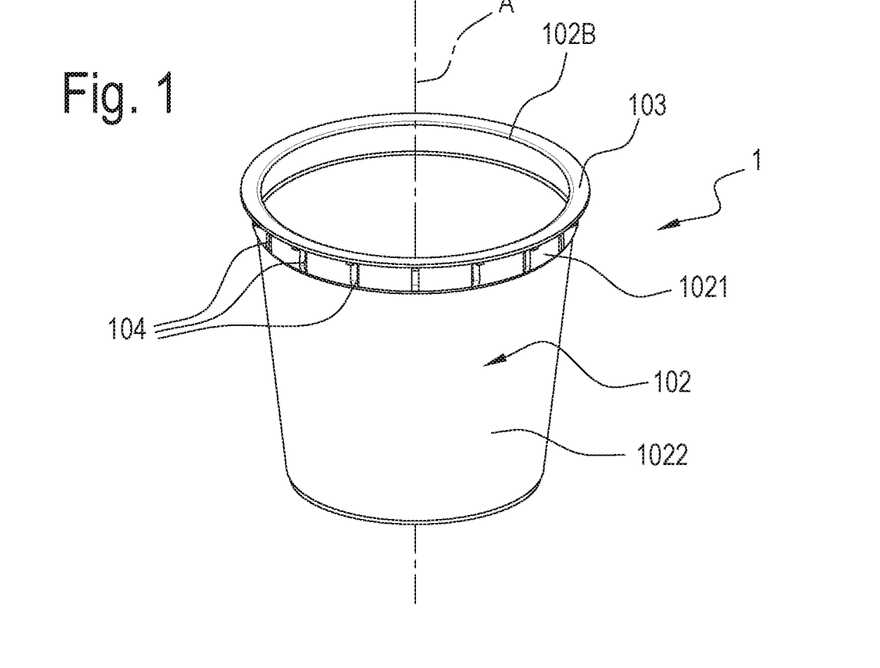
FIG. 1 shows a perspective view of a capsule body made according to one or more aspects of this disclosure.
Figure 2:
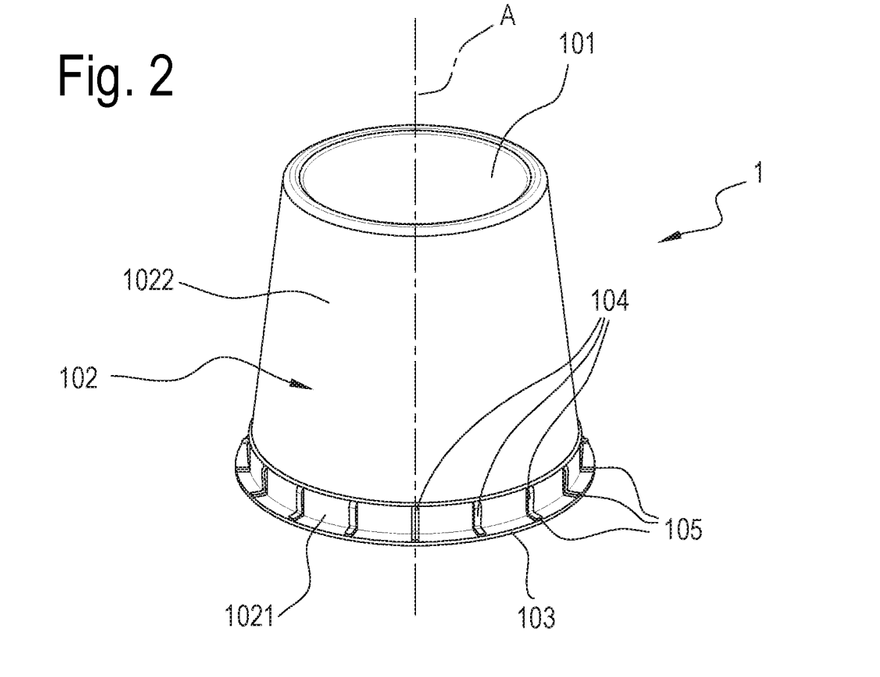
FIG. 2 shows the capsule body of FIG. 1 in a further perspective view.

The body 100 comprises a plurality of protrusions 104. The protrusions 104 project from the first portion 1021 of the outside surface of the side wall 102. The protrusions 104 are elongate in shape and extend in parallel (or substantially in parallel) with the longitudinal axis A. The protrusions 104 are equispaced around the longitudinal axis A. The protrusions 104 extend on the first portion 1021, from the connecting edge, joining the first portion 1021 and the second portion 1022, up to the second annular edge 102B (that is, up to the annular flange 103). Thus, each protrusion 104 extends from a first end, which is positioned on the connecting edge, joining the first portion 1021 and the second portion 1022, to a second end, which is in contact with the annular flange 103.

Figure 3:
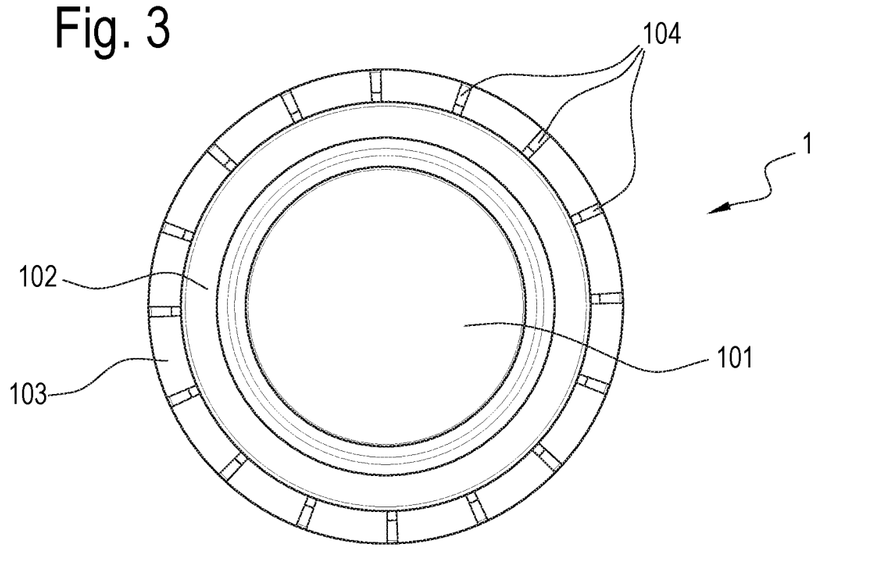
FIG. 3 shows the capsule body of FIG. 1 in a view from below.

The body 100 comprises a plurality of protuberances 105. The protuberances 105 protrude from a rear face of the annular flange 103, facing towards the side wall 102,—that is, towards the bottom wall 101.

The protuberances 105 have an elongate shape running along respective radial directions which extend radially from the longitudinal axis A. The protuberances 105 are angularly equispaced around the longitudinal axis A. Each protuberance 105 is joined to a corresponding protrusion 104.

More specifically, each protuberance 105 extends between a first end, which is joined to the second end of the corresponding protrusion 104, and a second end, which is located on an outer edge of the annular flange 103.

Figure 5:
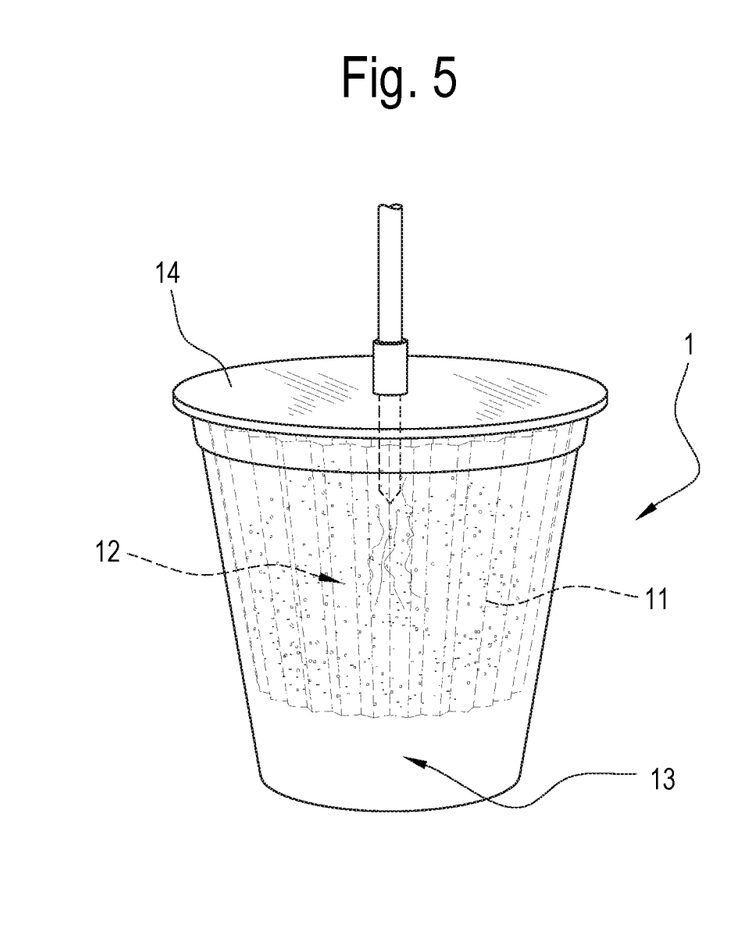
FIG. 5 shows the capsule of this disclosure, including the body illustrated in FIG. 1, the filter, the substance and the lid.

The capsule 1 comprises a lid 14. The lid 14 is joined to the front face of the annular flange 103. Thus, the protuberances 105 protrude from the annular flange 103, on the face opposite the face to which the lid 14 is applied.

The lid 14 and the body 100 delimit an internal space inside the capsule 1.

Figure 5A:
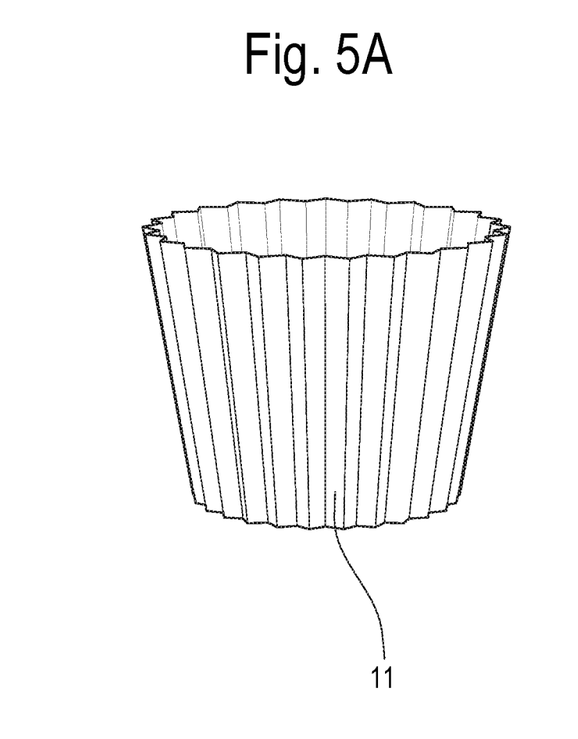
FIG. 5A shows the filter of the capsule of FIG. 5.

The capsule 1 also comprises a filter element 11. The filter element 11 is positioned in the internal space inside the capsule 1. Preferably, the filter element 11 is cup shaped and in turn includes a side wall and a bottom wall. The side wall of the filter element 11 also extends around the longitudinal axis A; The side wall of the filter element 11 is parallel, or substantially parallel, to the side wall 102 (or to the second portion 1022 of the side wall 102). The bottom wall of the filter element 11 is connected to the side wall of the filter element 11 (at a lower annular end of the filter element 11). Preferably, the bottom wall of the filter element 11 is parallel to the bottom wall 101 of the capsule body 100. Preferably, an upper annular end of the filter element 11 is joined (for example, glued) to the capsule body 100 in a zone proximal to the second annular edge 102B of the side wall 102. The bottom wall of the filter element 11 is spaced from the bottom wall 101 of the capsule body 100. Thus, the filter element 11 defines, within the internal space of the capsule 1, a containing space 12 which is included between the lid 14 and the bottom wall of the filter element 11, and a collecting space 13 which is included between the bottom wall of the filter element 11 and the bottom wall 101 of the capsule.

The substance for making the beverage (coffee granules, for example) is located in the containing space 12. The collecting space 13 is full of air.

When the capsule 1 is inserted into the beverage making machine, an injector 4 pierces the lid 14 and feeds hot water into the containing space 12. The beverage is produced by infusion and percolates into the collecting space 13 through the filter element 11. The machine then pierces the bottom wall 101 to dispense the beverage made.

Figure 6:
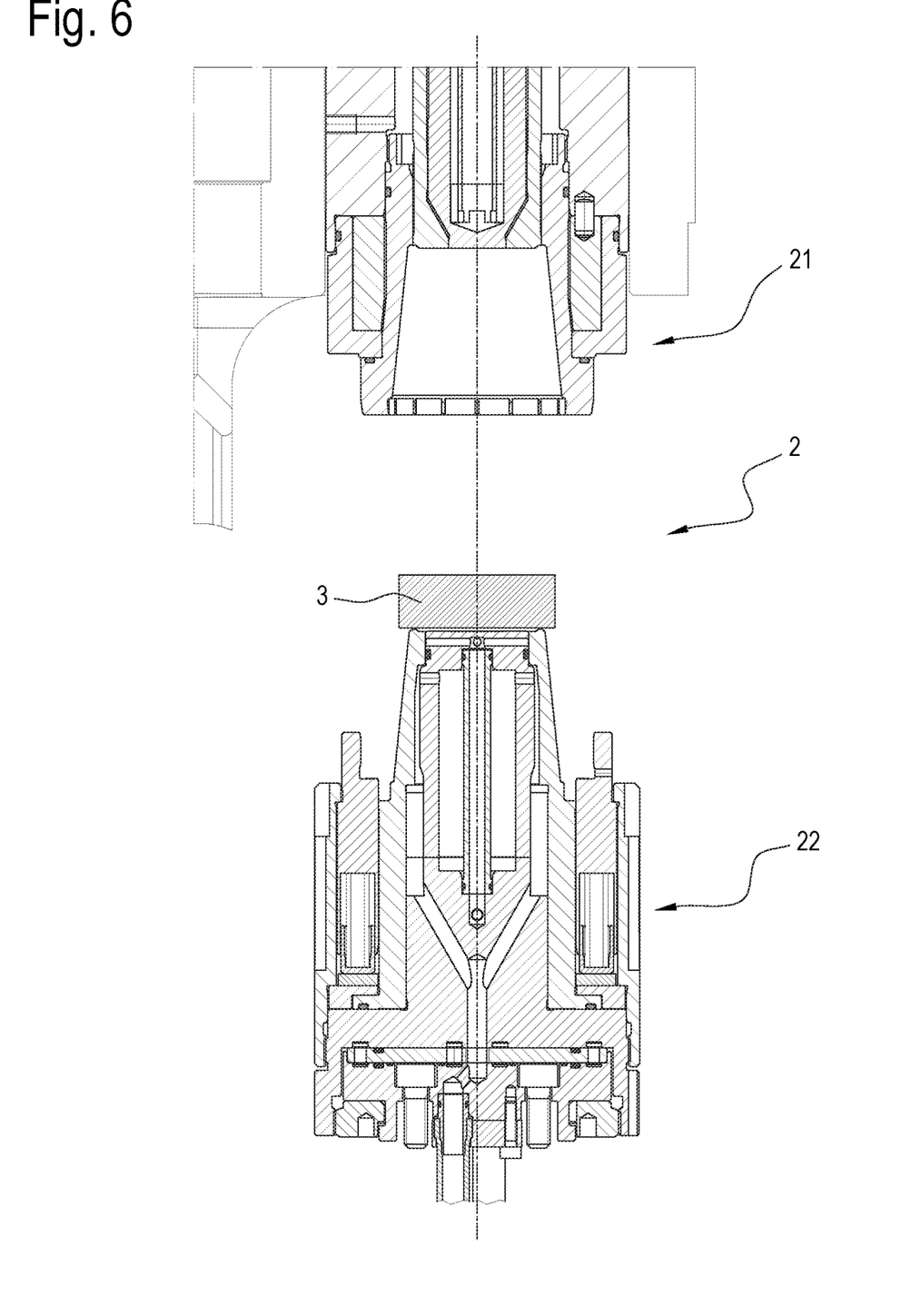
FIG. 6 shows a mould for making the capsule body of FIG. 1 in an open configuration.
Figure 7:
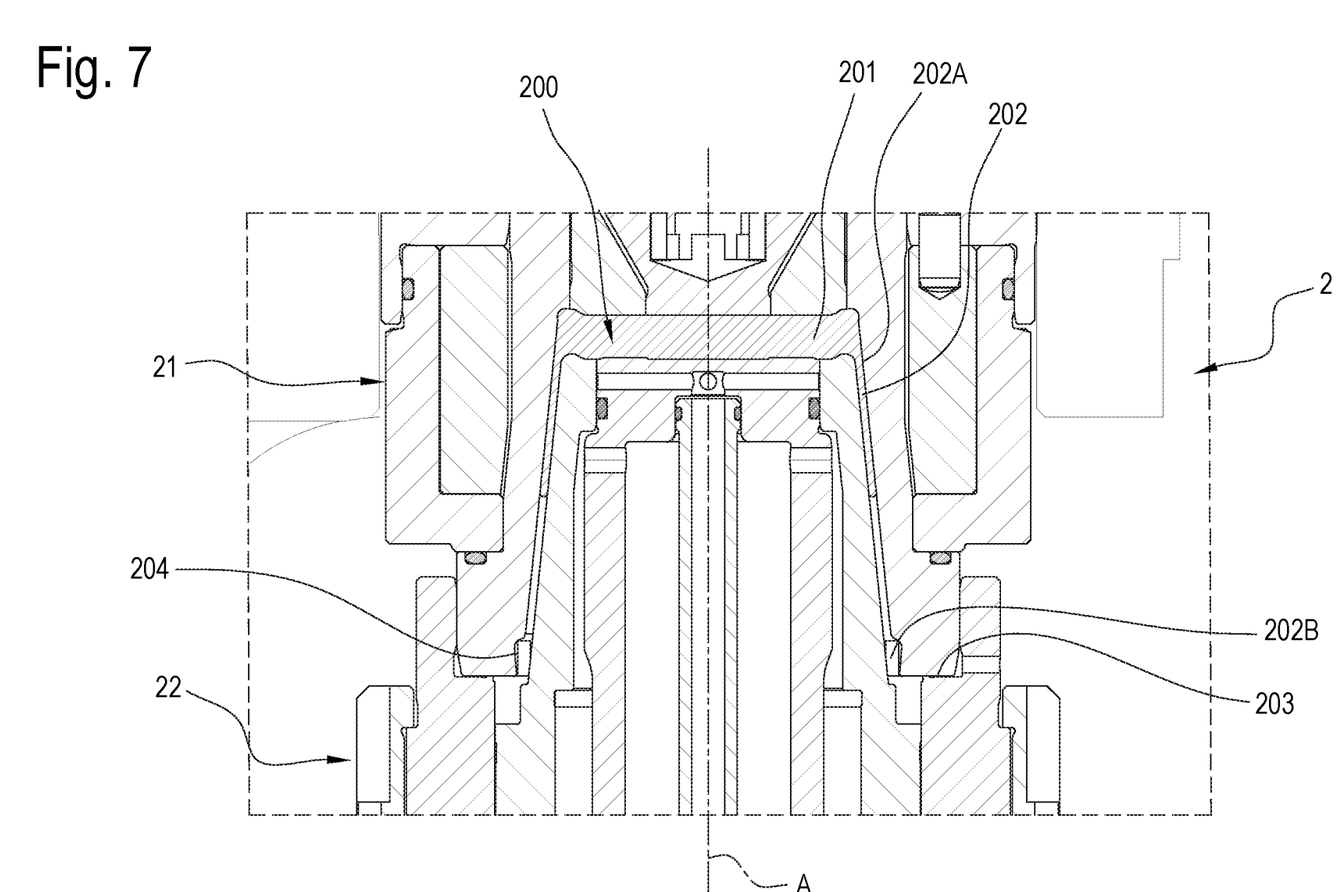
FIG. 7 shows the mould of FIG. 6 in a closed configuration.

This disclosure also relates to a mould 2. The mould 2 is shaped in such a way as to form the body 100 of the capsule 1. The mould 2 comprises an upper unit 21 and a lower unit 22, movable relative to each other along a longitudinal axis A (which coincides with the longitudinal axis A of the body 100 formed). The upper unit 21 and the lower unit 22 are movable relative to each other between a spaced-apart position, which defines an open configuration of the mould 2, and a close-together position, which defines a closed configuration of the mould 2. In the open configuration, the mould 2 is configured to receive a charge 3 of thermoplastic material. Preferably, the charge 3 is placed on the lower unit 22. In the closed configuration, the upper unit 21 and the lower unit 22 delimit a moulding cavity 200 in which the body 100 of the capsule 1 is formed by compression moulding, starting from the charge 3.

The moulding cavity 200 includes a bottom recess 201, configured to form the bottom wall 101 of the body 100 of the capsule 1.

The moulding cavity 200 also includes a side recess 202, connected to (that is, in communication with) the bottom recess 201. The side recess 202 is configured to form the side wall 102 of the body 100 of the capsule 1. More specifically, the side hollow 202 extends around the longitudinal axis A, between a first annular end 202A and a second annular end 202B.

The first annular end 202A is connected to the bottom hollow. The moulding cavity 200 also includes a flange hollow 203, which extends from the second annular end 202B away from the longitudinal axis. Thus, the flange recess 203 is connected to (that is, in communication with) the side recess 202, at the second annular end 202B. The side hollow 203 is configured to form the annular flange 103 of the body 100 of the capsule 1.

The moulding cavity 200 also includes a plurality of recesses 204, disposed around the longitudinal axis A in a portion of the side hollow 202 proximate to the flange hollow 203; more specifically, the recesses 204 are hollows in an outside wall of the side hollow 202, opposite to an inside wall facing towards the longitudinal axis. The recesses 204 are configured to form the protrusions 104.

The moulding cavity 200 also includes a plurality of concavities (not illustrated), formed in a rear wall of the flange hollow 203 and configured to form the protuberances 105.

The invention claimed is:

1. A capsule, intended for the preparation of a beverage in a device for making the beverage, the capsule comprising a body which includes
   a bottom wall;
   a side wall extending around a longitudinal axis between a first annular edge, connected to the bottom wall, and a second annular edge, wherein the side wall has an inside surface, facing towards the longitudinal axis, and an outside surface, opposite to the inside surface; and
   an annular flange, extending from the second annular edge of the side wall, away from the longitudinal axis,
   wherein the outside surface of the side wall includes a first portion, which is proximal to the flange, and a second portion, which is distal from the flange;
   wherein the second annular edge has a diameter that is greater than or equal to 40 mm and wherein the capsule has a length that is greater than or equal to 35 mm along the longitudinal axis,
   wherein the body includes a plurality of protrusions disposed around the longitudinal axis and projecting from the first portion of the outside surface of the side wall, so each of the plurality of protrusions produces local thickening of the side wall,
   wherein the annular flange has a rear face, which is directed towards the bottom wall, and a front face opposite to the rear face, wherein the body includes a plurality of protuberances, disposed around the longitudinal axis and projecting from the rear face of the annular flange, so each protuberance of the plurality of protuberances produce local thickening of the annular flange, the number of protrusions of the plurality of protrusions being equal to the number of protuberances of the plurality of protuberances and each protuberance of the plurality of protuberances being joined to a corresponding protrusion of the plurality of protrusions, so that each protuberance constitutes an extension of the corresponding protrusion onto and along the rear face of the flange.

2. The capsule according to claim 1, wherein the protrusions extend along respective axes which are contained in respective planes passing through the longitudinal axis.

3. The capsule according to claim 2, wherein the protrusions are angularly equispaced around the longitudinal axis.

4. The capsule according to claim 3, wherein the plurality of protrusions includes at least three protrusions.

5. The capsule according to claim 1, wherein the protuberances extend along respective radial axes, where the radial axes extend radially from the longitudinal axis.

6. The capsule according to claim 1, wherein each of the plurality of protuberances is joined to a corresponding protrusion of the plurality of protrusions.

7. The capsule according to claim 6, wherein each of the plurality of protuberances makes with the corresponding protrusion an angle between 40° and 55°.

8. The capsule according to claim 1, further comprising:
a lid, joined to the annular flange to delimit, with the body, an internal space inside the capsule;
a filter element, positioned in the internal space, wherein the filter element divides the internal space into a containing space and a collecting space, wherein the containing space is partly delimited by the lid and the collecting space is partly delimited by the bottom wall; and
a substance contained in the containing space and used for making the beverage.

9. The capsule according to claim 1, wherein the side wall of the capsule has a frustoconical portion which is distal from the flange and a cylindrical portion which is proximal to the flange.

10. The capsule according to claim 1, wherein the annular flange extends from the second annular edge of the side wall, away from the longitudinal axis, so that a radial extension of the annular flange is greater than its thickness.

11. The capsule according to claim 1, wherein each of the protuberances has a first portion having a radial extension which is equal to the radial extension of an underside surface of the annular flange.

12. The capsule according to claim 1, wherein the second annular edge is greater than or equal to 45 mm in diameter.

13. The capsule according to claim 1, wherein the length of the capsule is greater than or equal to 40 mm.

14. The capsule according to claim 1, wherein each protuberance extends along the annular flange a first length, and each protrusion extends along the body a second length that is larger than the first length.

* * * * *